US011310287B2

(12) United States Patent
Orabona et al.

(10) Patent No.: US 11,310,287 B2
(45) Date of Patent: Apr. 19, 2022

(54) METHODS AND NODES IN A LAWFUL INTERCEPTION SYSTEM

(71) Applicant: Telefonaktiebolaget LM Ericsson (publ), Stockholm (SE)

(72) Inventors: Luciano Orabona, Caserta (IT); Pompeo Santoro, Farsta (SE); Andrea Senatore, Pellezzano (IT); Elvira Villani, Salerno (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 292 days.

(21) Appl. No.: 16/498,077

(22) PCT Filed: Apr. 26, 2017

(86) PCT No.: PCT/SE2017/050410
§ 371 (c)(1),
(2) Date: Sep. 26, 2019

(87) PCT Pub. No.: WO2018/199820
PCT Pub. Date: Nov. 1, 2018

(65) Prior Publication Data
US 2020/0028881 A1 Jan. 23, 2020

(51) Int. Cl.
*H04L 29/06* (2006.01)
*H04L 65/10* (2022.01)
(Continued)

(52) U.S. Cl.
CPC .......... *H04L 63/306* (2013.01); *H04L 65/103* (2013.01); *H04L 65/1006* (2013.01);
(Continued)

(58) Field of Classification Search
CPC ............... H04L 63/306; H04L 65/1006; H04L 65/1016; H04L 5/103; H04L 65/1083; H04W 80/10
See application file for complete search history.

(56) References Cited

U.S. PATENT DOCUMENTS 9,602,551 B2    3/2017  Marfia et al.
10,764,335 B2 * 9/2020  Ascione ............ H04L 29/06217
(Continued)

FOREIGN PATENT DOCUMENTS

CN    101189849 A    5/2008
CN    101325781 A    12/2008
(Continued)

OTHER PUBLICATIONS

ETSI, "Digital Cellular Telecommunications System (Phase 2+); Universal Mobile Telecommunications System (UMTS); LTE; Interworking Between the IP Multimedia (IM) Core Network (CN) Subsystem and Circuit Switched (CS) Networks (3GPP TS 29.163 Version 11.8.0 Release 11)", Technical Specification, ETSI TS 129 163 V11.8.0, Sep. 1, 2013, pp. 1-328, ETSI.
(Continued)

Primary Examiner — Khaled M Kassim
(74) Attorney, Agent, or Firm — Coats + Bennett, PLLC

(57) ABSTRACT

The present disclosure relates to the problem to deliver correlation information, CN, in case of CC delivery in TDM format to a Monitoring Centers, MC in a circuit switched network and achieving a minimal impact to MCs and/or no impact on the operator network at all. Said problem is solved by using the extension field of calling or called party number for providing the correlation number to a MC from a Mediation Function entity.

16 Claims, 5 Drawing Sheets

(51) Int. Cl.
*H04L 65/1016* (2022.01)
*H04L 65/1023* (2022.01)
*H04L 65/1083* (2022.01)
*H04W 80/10* (2009.01)

(52) U.S. Cl.
CPC ...... *H04L 65/1016* (2013.01); *H04L 65/1083* (2013.01); *H04W 80/10* (2013.01)

(56) References Cited

U.S. PATENT DOCUMENTS

| | | | | |
|---|---|---|---|---|
| 2003/0101356 | A1* | 5/2003 | Miettinen | H04M 3/2281 726/4 |
| 2008/0049926 | A1* | 2/2008 | Imbimbo | H04L 12/4641 379/225 |
| 2008/0198993 | A1 | 8/2008 | Imbimbo et al. | |
| 2010/0039946 | A1* | 2/2010 | Imbimbo | H04L 67/14 370/252 |
| 2012/0254403 | A1 | 10/2012 | Imbimbo et al. | |
| 2016/0164775 | A1* | 6/2016 | Marfia | H04L 65/80 370/230.1 |
| 2017/0187755 | A1* | 6/2017 | Rao | H04L 63/306 |
| 2018/0241782 | A1* | 8/2018 | Senatore | H04L 65/608 |
| 2019/0289080 | A1* | 9/2019 | Rao | H04L 67/146 |

FOREIGN PATENT DOCUMENTS

| | | |
|---|---|---|
| CN | 101557603 A | 10/2009 |
| CN | 104782080 A | 7/2015 |
| WO | 2007004938 A1 | 1/2007 |
| WO | 2010142172 A1 | 12/2010 |
| WO | 2016005007 A1 | 1/2016 |

OTHER PUBLICATIONS

ETSI, "Lawful Interception (LI); Handover Interface for the Lawful Interception of Telecommunications Traffic", ETSI Standard, ETSI ES 201 671 V3.1.1, May 1, 2007, pp. 1-124, ETSI.

ETSI, "Lawful Interception (LI); Handover Interface and Service-Specific Details (SSD) for IP Delivery; Part 5: Service-Specific Details for IP Multimedia Services", Technical Specification, ETSI TS 102 232-5 V2.5.1, Oct. 1, 2010, pp. 1-26, ETSI.

Camarillo, G. et al., "Mapping of Integrated Services Digital Network (ISDN) User Part (ISUP) Overlap Signalling to the Session Initiation Protocol (SIP)", RFC 3578, Aug. 1, 2003, pp. 1-13, Network Working Group.

3rd Generation Partnership Project, "3rd Generation Partnership Project; Technical Specification Group Core Network and Terminals; Interworking Between the IP Multimedia (IM) Core Network (CN) Subsystem and Circuit Switched (CS) Networks (Release 12)", Technical Specification, 3GPP TS 29.163 V12.2.0, Dec. 1, 2013, pp. 1-328, 3GPP.

3rd Generation Partnership Project, "3rd Generation Partnership Project; Technical Specification Group Services and System Aspects; 3G Security; Handover Interface for Lawful Interception (LI) (Release 12)", Technical Specification, 3GPP TS 33.108 V12.3.0, Dec. 1, 2013, pp. 1-208, 3GPP.

3rd Generation Partnership Project, "3rd Generation Partnership Project; Technical Specification Group Services and System Aspects; 3G Security; Lawful Interception Requirements (Release 8)", Technical Specification, 3GPP TS 33.106 V8.1.0, Mar. 1, 2008, pp. 1-11, 3GPP.

3rd Generation Partnership Project, "3rd Generation Partnership Project; Technical Specification Group Services and System Aspects; 3G Security; Lawful Interception Architecture and Functions (Release 8)", Technical Specification, 3GP TS 33.107 V8.1.0, Sep. 1, 2007, pp. 1-87, 3GPP.

3rd Generation Partnership Project, "3rd Generation Partnership Project; Technical Specification Group Services and System Aspects; 3G Security; Handover Interface for Lawful interception (LI) (Release 8)", Technical Specification, 3GPP TS 33.108 V8.1.0, Sep. 1, 2007, pp. 1-125, 3GPP.

ETSI, "Draft ETSI TS 1XX XXX V0.0.7 (May 2006): Telecoms & Internet Converged Services & Protocols for Advanced Networks (TISPAN); NGN Lawful Interception; Lawful Interception Functional Entities, Information Flow and Reference Points", 3GPP TSG-SA3 LE Meeting #22, Montreal, Canada, Jun. 28, 2006, pp. 1-23, Tdoc S3LI0680, ETSI.

"Repair of Hanging Paragraphs", 3GPP TSG-SA3LI Meeting #55, Portland, Oregon, Oct. 28, 2014, pp. 1-175, SA3LI14_147r2, 3GPP.

* cited by examiner

METHODS AND NODES IN A LAWFUL INTERCEPTION SYSTEM

TECHNICAL FIELD

The present technology relates to methods and nodes in a LI system for enabling the transmission of correlation numbers via HI2 and HI3.

BACKGROUND

At present Network Operators are more and more implementing new technology based on IP Multimedia Subsystem (IMS) for Voice over IP (VoIP), e.g. Voice over LTE (VoLTE).

From Lawful Interception point of view this means that new mechanisms, based on new standards, must be implemented for enabling Content of Communication (CC) packet delivery of intercepted call to the Monitoring Centers (MCs).

The Law Enforcement Agencies (LEAs) have then to update the MCs for supporting new delivery methods based on new standards, because Circuit Switched (CS) MCs are not able to intercept voice on Packet switched (PS) networks, e.g. IMS-based VoIP.

FIG. 1 is illustrating a communications system and LI core network 100 wherein an MC 180 is served by a CS network 110.

In order to reduce implementation costs and reuse old MC Hardware (HW), LEAs are more and more requesting Mediation Function (MF) to provide (CC) in Time-Division Multiplexing (TDM) format.

In order to provide CC in TDM format, a possible solution is that the MF initiates a Session Initiation Protocol, SIP, call towards a Border Gateway Control Function (BGCF) 150 and Media Gateway (MGW) 170 with the MC as called party. The MGW 170 is configured to convert the call in TDM format in order to route it over legacy Public Switched Telephone Network (PSTN) 110.

According to LI standards, a correlation parameter must be provided on both Handover Interfaces HI2 and HI3, to correlate intercepted CC and Intercept Related Information (IRI) so that the LEA can retrieve the warrant information and then associate the intercepted subject.

Due to that, the above solution has a known limitation that is the missing of provisioning of correlation information towards the MC, over HI3, making it difficult to correlate the call with the correct IRI.

A way to provide the correlation information on HI3 interface, when TDM is used, consists of inserting it into some Integrated Services Digital Network (ISDN) user part fields, ISUP, (e.g. User-to-User Signalling 1 (UUS1)). However this implies either the support of SIP-I (SIP with encapsulated ISUP) or a customization of SIP interface between the MF and BGCF A usage of SIP-I to provide correlation information encapsulated in ISUP would mean forcing the BGCF/MGW to support SIP-I and forcing the MF to call a pre-assigned list of MCNBs (Monitoring Centers numbers) for each warrant.

Both cases lead to great impacts on existing core network.

SUMMARY

One problem to be solved is how to deliver correlation information in case of CC delivery in TDM format and thereby achieving a minimal impact to MCs and/or no impact on the operator network at all.

Said problem is solved by using extension of calling or called party number for providing the correlation number to a MC.

According to a first aspect, a method of a Mediation Function, MF, in a Lawful Intercept, LI, system and embodiments of the method are provided. The MF is configured to deliver received Content of Communication, CC, and Intercept Related Information. IRI, to a Monitoring Centre, MC, monitoring a target's sessions. Said MC is situated in and supported by a Circuit Switched, CS, communications system and network. The method comprises the steps of receiving IRI and CC of a target's session intercepted during a VoIP session; generating a correlation number, CN, for the IRI and CC of the intercepted session; and If MC is in a CS system, retrieving the calling party number of the MF and/or the called party number of the MC. The method further comprises inserting CN in an extension field of the calling or called party number; initiating, after receiving CC, a CC transmission session via a Session Initiating Protocol, SIP, call to the MC by sending a SIP invitation comprising CN in the extension field of the called party number or of the calling party number towards a Border Gateway Control Function, BGCF, node for selecting a Media Gateway; and sending CC packets to MC over HI3 via the selected Media Gateway converting CC packet format into TDM format and IRI over HI2 to the MC using the same CN.

According to a second aspect, a method of a Monitoring Center, MC, in a Lawful Intercept, LI, system and embodiments of the method are provided.

Said MC is configured to receive Content of Communication, CC, and Intercept Related Information, IRI, from a Mediation Function, MF, node. The MC is situated in and supported by a circuit switched, CS, communications system. The method comprises the steps of receive a correlation number, CN, of a target's session in an extension field of a called party number or of a calling party number in an initiate address message; searching for CN in the extension field in the calling party number or in the called party number; if CN is identified in an extension field, accepting a transmission session with the MF; and receiving from the target's session the converted TDM traffic from MF over HI3 via a Media Gateway and IRI over HI2 from the MF using the same CN.

According to a third aspect, a Mediation Function, MF, node of a Lawful Intercept, LI, system and embodiments of the MF node are provided. The Mediation Function, MF, is configured to deliver received Content of Communication, CC, and Intercept Related Information. IRI, to a Monitoring Centre, MC, monitoring a target's sessions. Said MC is situated in and supported by a circuit switched, CS, communications system and network. The MF node comprises a processing unit and a communication interface configured for receiving IRI and CC of a target's session intercepted during a VoIP session, wherein the processing unit further is configured to generate a correlation number, CN, for the IRI and CC of the intercepted session, and if MC is in a CS system, to retrieve the calling party number of the MF and/or the called party number of the MC, and to insert CN in an extension field of the calling or called party number, and to initiate, after receiving CC, a CC transmission session via a Session Initiating Protocol, SIP, call to the MC by sending a SIP invitation comprising CN in the extension field of the called party number or of the calling party number towards a Border Gateway Control Function, BGCF, node for selecting a Media Gateway. The processing unit and communication interfaces are configured to send the CC packets to MC over HI3 via the selected Media Gateway converting CC packet format into TDM format and IRI over HI2 to the MC using the same CN.

According to a fourth aspect, a Monitoring center, MC, in a Lawful Intercept, LI, system and embodiments of the MC are provided. The MC is configured to receive Content of Communication, CC, and Intercept Related Information, IRI, from a Mediation Function, MF, node, wherein the MC is situated in and supported by a circuit switched, CS, communications system. The MC comprises a processing unit and a communication interface configured to receive a correlation number, CN, of a target's session in an extension field of a called party number or of a calling party number in an initiate address message. The processing unit is further configured to search for CN in the extension field in the calling party number or called party number, and if CN is identified in an extension field, accepting a transmission session with the MF, wherein the receiving interface is configured to receive TDM traffic from MF over HI3 via a Media Gateway node and IRI over HI2 from MF using the same CN.

According to yet one aspect a computer program is provided, said computer program comprising computer program code which, when run in a processor of a mediation function node, causes the mediation function node to perform the method steps of receiving IRI and CC of a target's session intercepted during a VoIP session; generating a correlation number, CN, for the IRI and CC of the intercepted session; and If MC is in a CS system, retrieving the calling party number of the MF and/or the called party number of the MC. The method further comprises inserting CN in an extension field of the calling or called party number; initiating, after receiving CC, a CC transmission session via a Session Initiating Protocol, SIP, call to the MC by sending a SIP invitation comprising CN in the extension field of the called party number or of the calling party number towards a Border Gateway Control Function, BGCF, node for selecting a Media Gateway; and sending CC packets to MC over HI3 via the selected Media Gateway converting CC packet format into TDM format and IRI over HI2 to the MC using the same CN.

A computer program product is also provided comprising the above described computer program and a computer readable means on which the computer program is stored.

According to yet one aspect a computer program comprising computer program code which, when run in a processor of a monitoring center node, causes the node to perform the method steps of receiving a correlation number, CN, of a target's session in an extension field of a called party number or of a calling party number in an initiate address message; searching for CN in the extension field in the calling party number or in the called party number; if CN is identified in an extension field, accepting a transmission session with the MF; and receiving from the target's session the converted TDM traffic from MF over HI3 via a Media Gateway and IRI over HI2 from the MF using the same CN.

A computer program product comprising a computer program as described above for a monitoring center and a computer readable means on which the computer program is stored.

The advantage of this solution compared to other possible solutions is that there are no requirements for amending existing network. The network operator will be able to provide CC delivery in TDM format for intercepted calls with minimum impacts on the operator network, and the LEAs will have CC delivery in TDM format for intercepted call with minimum impacts on MCs.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present technique for solving at least one of the stated problems. However, it will be apparent to one skilled in the art that the present technique for solving the problem may be practiced in other embodiments that depart from these specific details. In other instances, detailed descriptions of well-known methods, devices, and circuits are omitted so as not to obscure the description of the present technique with unnecessary detail.

Figure 1:
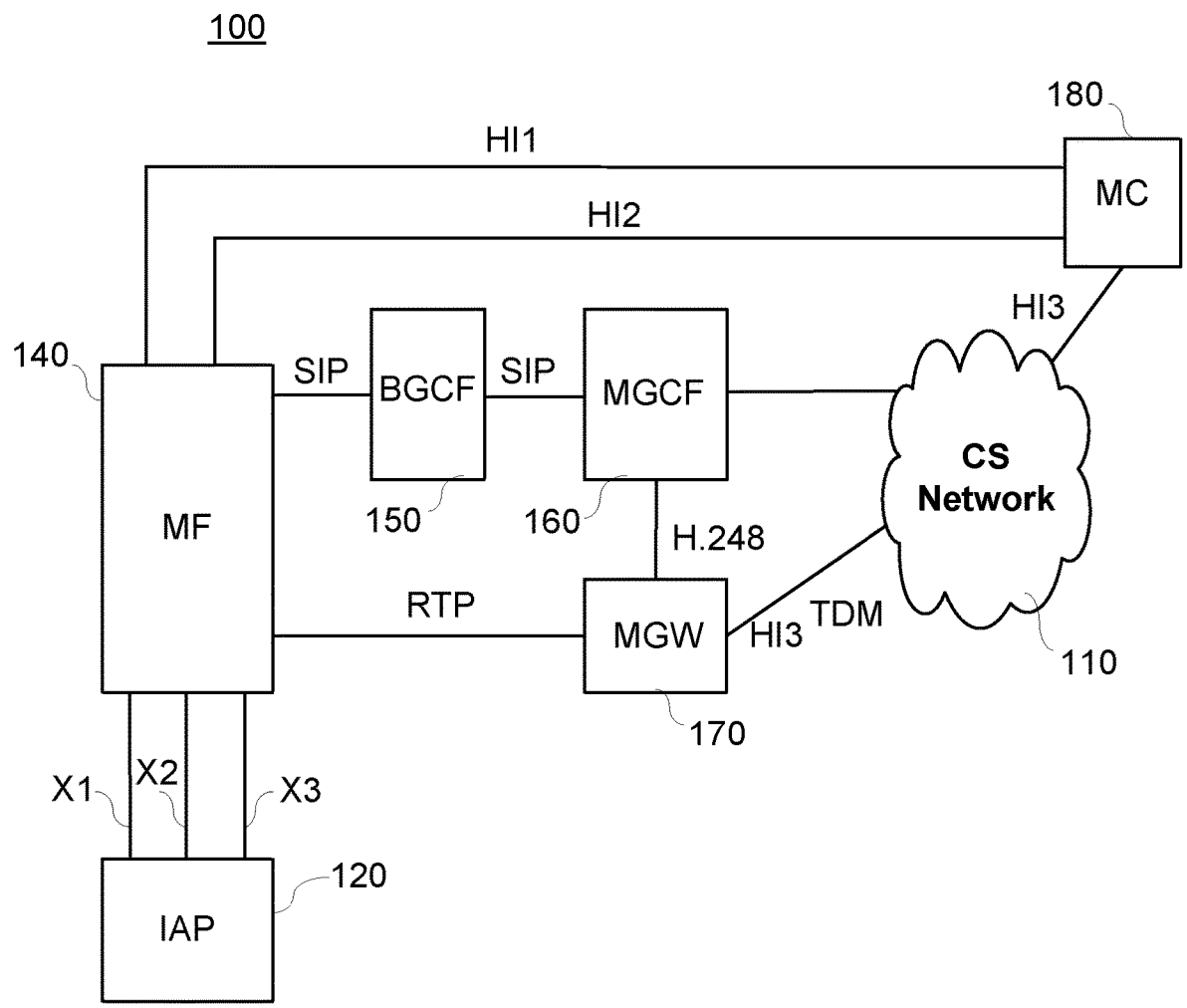
FIG. 1 is a block diagram of an exemplary network in which systems and methods described herein may be implemented.

FIG. 1 is illustrating a communications system and LI core network 100 wherein an MC 180 is served by a CS network 110.

Said system and network 100 comprises a number of entities. The exemplary LI system comprises a monitoring center, MC, 180. The MC is preferably involving a Law Enforcement Management Function (LEMF; not shown) for requesting LI services of the LI system and collecting the intercepted information of one or more Intercepting Access Points, IAPs, 120 situated and hidden in different nodes of data and telecommunications system that are serving user of which some users are surveyed by one or more Law Enforcement Agencies. Surveyed users are herein denoted targets.

The LI system shall provide access to the intercepted Content of Communications, CC, and Intercept Related Information, IRI, of a target and services related to the target on behalf of said one or more Law Enforcement Agencies, LEAs. Said CC and IRI is gathered by a MC 180 and delivered to a LEA.

An intercept request, also denoted Request for LI activation, is sent through a first Handover Interface, HI1, located between the MC 180 and a Mediation Function, MF, 140 of an Intercept Mediation and Delivery Unit, IMDU, comprising an Administration Function, ADMF. Said Mediation Function 140 and Administration Function generate based on said received request a warrant comprising said one or more target identities, and sends said warrant towards an Intercepting Access Point, IAP, 120 via an interface denoted X1. The IAP 120 may be connected to a node of a network, e.g. the Internet, a 3 GSM (third Generation Mobile Communications System), LTE (Long Term Evolution), etc., from which it intercepts said Content of Communications and Intercept Related Information of a mobile target. Said CC and IRI are network related data. As reference to the standard model, see references [1], [2] and [3], the content of communication is intercepted in the IAP network node and it is based upon duplication of target communication payload without modification. In reference [3], the interfaces HI1 and HI2 is specified in more detail. The IAP sends IRI raw data via an interface X2 to the Mediation Function 140 that generates and delivers to a collection functionality a standardized IRI report based on the received IRI report. Said standardized IRI report is sent over a standardized interface HI2 to the MC 180. The IAP 120 also sends CC raw data via an interface X3 to the Mediation Function 140, which generates and delivers to a standardized CC report based on the received CC report. Said standardized CC report is sent over a standardized interface HI3 to the requesting MC 180.

The HI2 and HI3 interfaces represent the interfaces between the MF 140 and the MC 180.

As already mentioned in the background of this disclosure, Circuit Switched (CS) MCs are not able to intercept voice on Packet switched (PS) networks, e.g. IMS-based VoIP. Such MCs request CC to be delivered over HI3 in TDM format.

In order to provide CC over HI3 in TDM format, a possible solution is that the MF initiates a Session Initiation Protocol, SIP, call towards a Border Gateway Control Function (BGCF) 150 and Media Gateway (MGW) 170 with the MC as called party. The MGW 170 is configured to convert the call in TDM format in order to route it over legacy Public Switched Telephone Network (PSTN) 110.

The BGCF, also denoted as Breakout Gateway Control Function, is a node that is a part of IP Multimedia Subsystem network and provides a bridge between IMS and PSTN network by determining where and how to route calls from IMS networks to circuit based networks. BGCF is needed to select where a breakout to the circuit switched domain for (voice) calls from the IMS domain to a e.g. a User Equipment, in the traditional CS domain, e.g. PSTN or PLMN, has to occur. If the breakout has to occur in the same network then the BGCF will select a Media Gateway Control Function; MGCF, node 160 and its Media Gateway, MGW, node 180 for the further proceeding.

Media gateways are often controlled by a separate Media Gateway Controller which provides the call control and signaling functionality. Communication between media gateways and Call Agents is achieved by means of protocols such as MGCP (Media Gateway Control Protocol) or Megaco (H.248) or Session Initiation Protocol (SIP). Modern media gateways used with SIP are often stand-alone units with their own call and signaling control integrated and can function as independent, intelligent SIP end-points.

Voice over Internet Protocol (VoIP) media gateways perform the conversion between Time-division multiplexing (TDM) voice to a media streaming protocol, such as the Real-time Transport Protocol, (RTP), as well as a signaling protocol used in the VoIP system.

If the breakout has to take place via another network than the network to which the BGCF belongs, the BGCF will forward the session to another BGCF, which is part of said other network.

According to LI standards, a correlation parameter must be provided on both Handover Interfaces HI2 and HI3, to correlate intercepted CC and Intercept Related Information (IRI) so that the LEA can retrieve the warrant information and then associate the intercepted subject.

Due to that, the above solution has a known limitation that is the missing of provisioning of correlation information towards the MC, over HI3, making it difficult to correlate the call with the correct IRI.

The suggested solution consists of using extension of calling party number for providing the correlation number because it minimizes impacts on Monitoring Centers but it can be generalized also considering, as alternative, the extension of the called party number for delivering correlation number.

The solution comprises one method performed by the mediation function and a corresponding method performed by the monitoring center. Said methods are in the following description explained with reference to the block diagram in FIG. 1.

Figure 2:
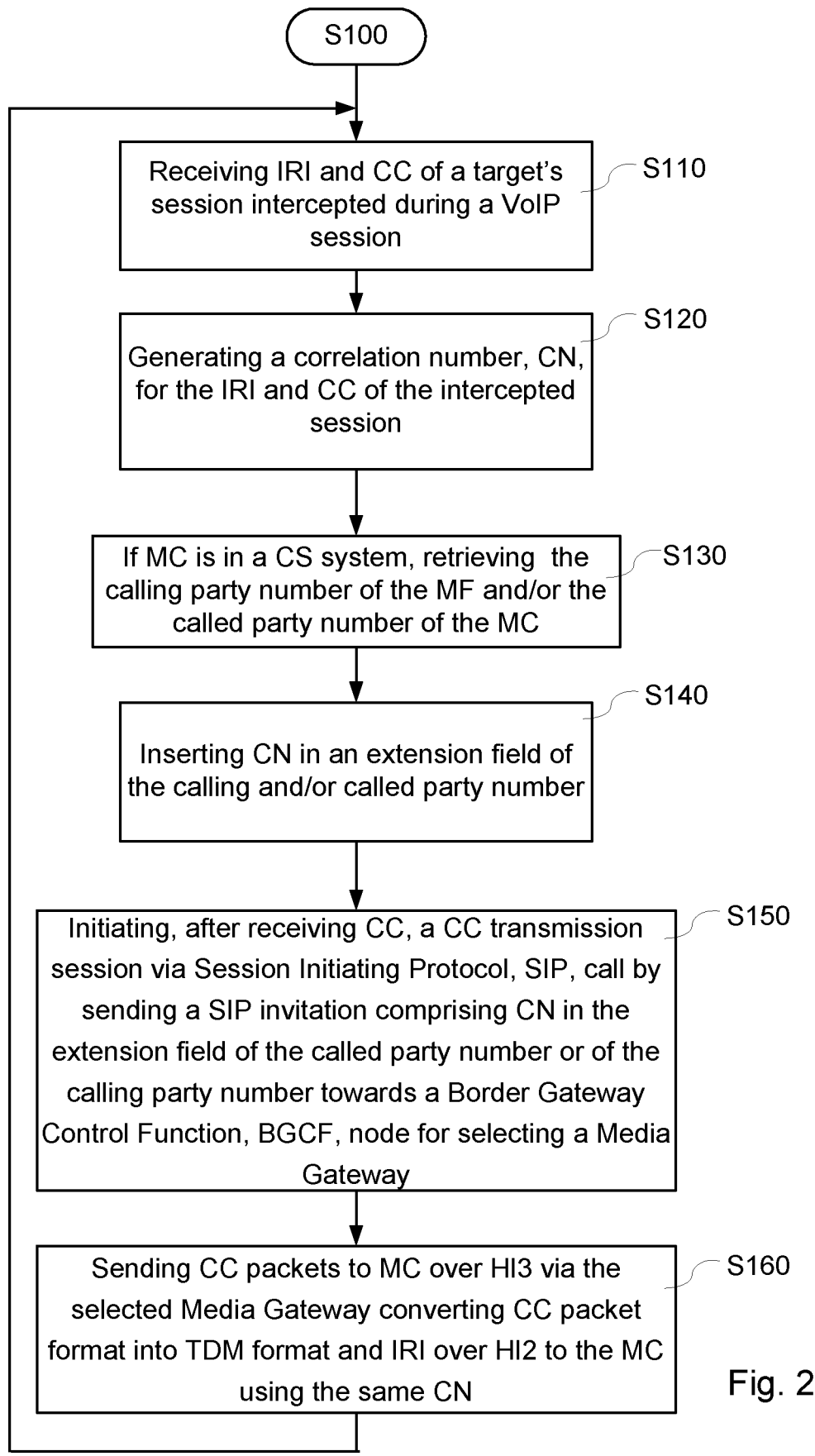
FIG. 2 is a flowchart illustrating a method for enabling the transfer of a correlation number.

FIG. 2 is a flowchart illustrating a method for enabling the transfer of a correlation number, which is generated by a MF, both over HI2 and HI3 from the MF.

The method is performed by a Mediation Function, MF, of a Lawful Intercept, LI, system. Said MF is configured to deliver received Content of Communication, CC, and Intercept Related Information. IRI, to a Monitoring Centre, MC, which monitors a target's sessions. Said MC is situated in and supported by a circuit switched, CS, communications system. The method comprises S110:—Receiving IRI and CC of a target's session intercepted during a VoIP session;
When the IAP identifies a VoIP session, e.g. LTE VoIP, of a listed target, the IAP 120 sends IRI over the X2 and CC over the X3 interfaces to the MF 140.

S120:—Generating a correlation number, CN, for the IRI and CC of the intercepted session;
The MF 140 is responsible for generating Correlation Number for each session/call for enabling the matching of IRI and CC sent over different interfaces HI2 and HI3 to the MC. Since the Correlation Number to be provided on HI3, in calling party number extension, is defined by the Mediation Function itself (not by the IAP), it can be either a communication-Identity-Number: Temporary Identifier used to uniquely identify the intercepted call in CS domain; or a real correlation Number: Identifier used to correlate CC with IRI, in PS domain, delivered in IRIs and all CC packets. In both cases it must be a sequence of digits and according to LI standards, it must be provided to the LEA also in IRIs messages over HI2 interface.

S130:—If MC is in a CS system, retrieving the calling party number of the MF and/or the called party number of the MC;
The MF is configured to call pre-assigned list of Monitoring Centers numbers MCNBs. The information of which MC should be served is included into the warrant specifying the target of interest to which the session belongs.

S140:—Inserting CN in an extension field of the calling or called party number;
When the Mediation Function (MF) initiates a SIP call towards a BGCF with the Monitoring Centre (MC) as called party, it uses the extension number field of calling party number or called party number for providing the correlation number as the call were initiated by a terminal, behind a Private Automatic Branch eXchange (PABX) having as extension number the correlation number. So the calling party number or called party number, for each call, will contain the number of the MF or MC with the correlation number as extension, i.e. for a Calling number: <MF number (PABX number field)><correlation number(extension number field)>.

S150:—Initiating, after receiving CC, a CC transmission session via a Session Initiating Protocol, SIP, call to the MC by sending a SIP invitation comprising CN in the extension field of the called party number or of the calling party number towards a Border Gateway Control Function, BGCF, for selecting a Media Gateway.

Figure 4:
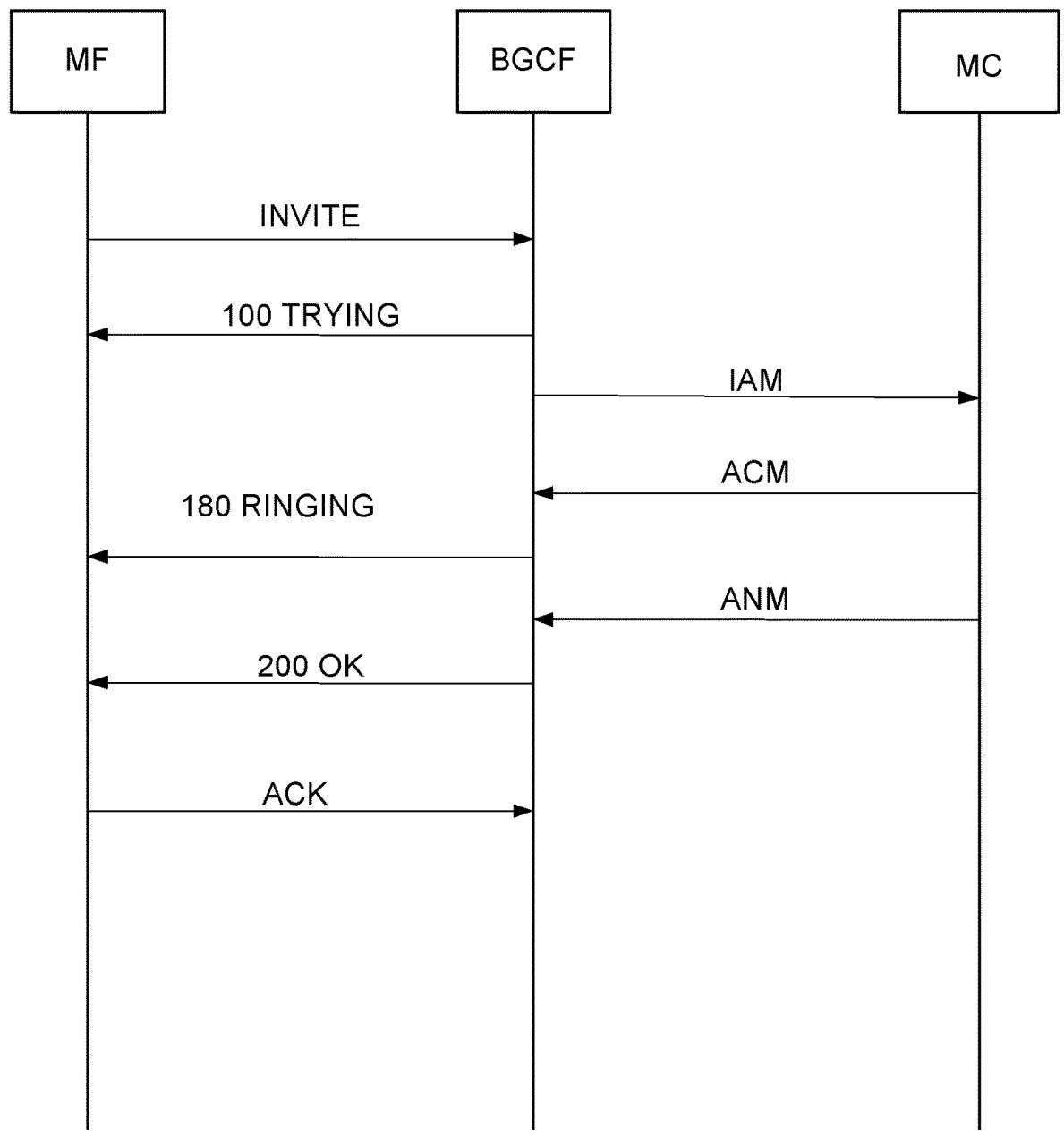
FIG. 4 is a signalling scheme illustrating the initiation of SIP call.

The SIP initiation procedure is described further down this description in relation to FIG. 4. The BGCF is configured to select a Media Gateway controlled by a Media Gateway Control Function for the CC transmission session.

S160:—Sending CC packets to MC over HI3 via the selected Media Gateway converting CC packet format into TDM format and IRI over HI2 to the MC using the same CN.

The CC is sent as RTP packets, which when received by the Media Gateway, MGW, are converted to TDM format. The MGW sends the TDM format packets, i.e. the converted RTP packets, to the MC.

Time Division Multiplexing, TDM, is a technique used in Circuit Switched network to transport voice calls. In particular TDM is used for circuit mode communication with a fixed number of channels and constant bandwidth per channel. TDM format usually indicates a 64 Kbit/second signal encoded with mu-law or A-law compression.

Figure 3:
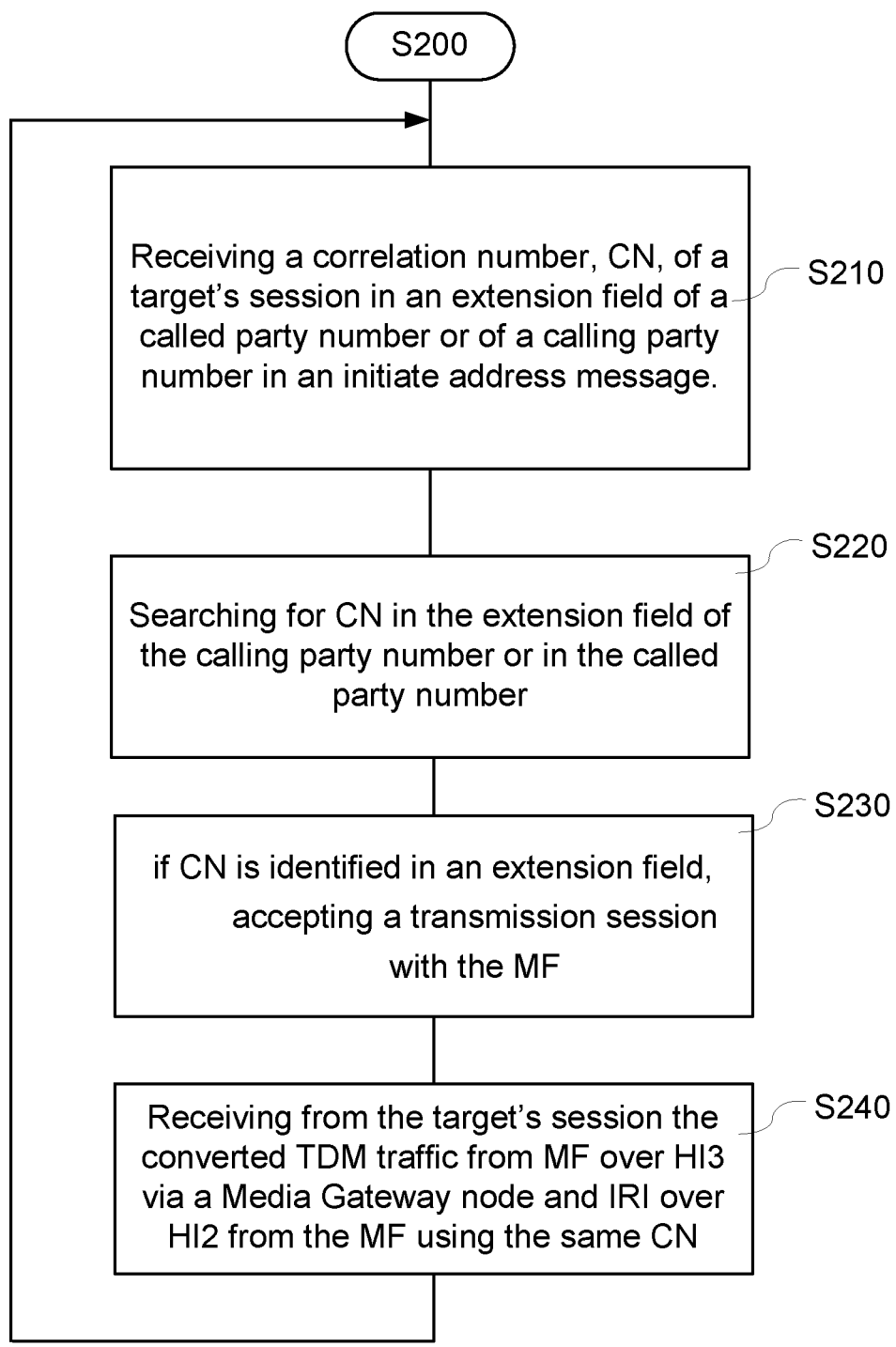
FIG. 3 is a flowchart illustrating a method of a Monitoring Center for enabling the reception of a correlation number.

FIG. 3 is a flowchart illustrating a method of a Monitoring Center for enabling the reception of a correlation number, which is generated by a MF, both over HI2 and HI3 from the MF.

The method of a Monitoring Centre, MC, of a Lawful Intercept, LI, system, said MC being configured to receive Content of Communication, CC, and Intercept Related Information, IRI, from an Mediation Function, MF, node, wherein the MC is situated in and supported by a circuit switched, CS, communications system, the method 200 comprising:

S210:—Receiving a correlation number, CN, of a target's session in an extension field of a called party number or of a calling party number in an initiate address message.

The calling party number is the identity number of the MF, while the called party number is the identity number of the MC. The SIP Invite message comprises a MCNB as the Called Party Number and a Mediation Function Number as Calling Party Number. The Media Gateway Control Function, MGCF, generates and copies the Called Party Number and a Mediation Function Number as a standard procedure in an Initiate Address Message, IAM. If the extension field of either the Calling Party Number or Called Party number contains the Correlation Number, said extension field is automatically copied to the IAM, see description of FIG. 4. The MGCF sends the IAM to the MC. The MC receives party numbers included in the IAM and stores them. There is therefore no reason for changing the design or function of the BGCF or MGCF nodes.

S220:—Searching for CN in the extension field of the calling party number or in the called party number.

The MC node is configured to look in the extension fields and to recognize a correlation number. So the calling number, for each call, will contain the number of the MF with the correlation number as extension in the extension field, i.e. for a Calling number: <MF number (PABX number)><correlation number(extension field)>.

S230:—if CN is identified in the extension field, accepting a transmission session with the MF.

When a transmission is accepted by the MC, there are a similar CN sent over the HI2 to the MC.

S240:—Receiving from the target's session the converted TDM traffic from MF over HI3 via a Media Gateway and IRI over HI2 from the MF using the same CN.

Thus, the transmission of the IRI over HI2 and the CC over HI3, the CC and IRI belonging to the same target session, are correlated with the same CN.

The CN is either Communication-Identity-Number or a real Correlation Number according to LI standards.

FIG. 4 is a signalling scheme illustrating the signalling during an initiation of a SIP call. The Mediation Function, MF, entity is configured to set up a SIP call. The MF generates and sends an SIP INVITE request towards the Monitoring Center, MC, via a Boarder Gateway Control Function, BGCF, node and Media Gateway Control Function, MGCF. The Invite message comprises the "To/Request-URI" field, which comprises the Monitoring Center Number, MCBN, and the "Contact/From/P-Asserted-Identity" field comprises the Mediation Function Number wherein the extension field contains the Correlation Number, CN, inserted by the MF.

The BGCF/MGCF, may be two separate nodes but herein regarded as one entity, responds by sending a signalling acknowledgement message "100 TRYING". The BGCF/MGCF generates and sends an Initial Address Message, IAM, comprising the MCNB as the Called Party Number and a Mediation Function Number as Calling Party Number wherein the extension field of either the Calling Party Number or Called Party number contains the Correlation Number as Calling Party Number.

The MC receives party numbers included in the IAM and stores them. Then, the MC generates and sends an Address Complete Message, ACM, towards the BGCF/MGCF. The BGCF/MGCF receives the ACM and generates a signalling message "180 RINGING" meaning that "Destination user agent received INVITE, and is alerting user of call".

The MC generates and sends an "Answer Message", AM, towards the BGCF/MGCF, which sends a signalling message "200 OK", indicating that the INVITE request was successful. The MF sends an acknowledgement signalling message to the BGCF/MGCF.

Thus, the MC has received the CN via a link involving the BGCF/MGCF nodes and the MF, which link is a HI3 interface. The CC in RTP packets are received via the HI3 interface by the Media Gateway MGW, related to the BGCF/MGCF (the BGCF selects MGCF which is the control function of the MGW), and the MGW converts the RTP packets into TDM format, which is delivered over the HI3 interface to the MC.

The above proposed methods and embodiments thereof may be implemented in a mediation function(-ality) node MF in a LI system and a monitoring center. Said implementations are hereafter presented and illustrated with reference to FIGS. 5 and 6.

The method and embodiments thereof may be implemented in digital electronically circuitry, or in computer hardware, firmware, software, or in combinations of them. Apparatus of the technique may be implemented in a computer program product tangibly embodied in a machine readable storage device for execution by a programmable processor; and method steps of the described method and embodiments thereof may be performed by a programmable processor executing a program of instructions to perform functions of the LI system by operating on input data and generating output.

The method and its embodiments may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially—designed ASICs (Application Specific Integrated Circuits).

Figure 5:
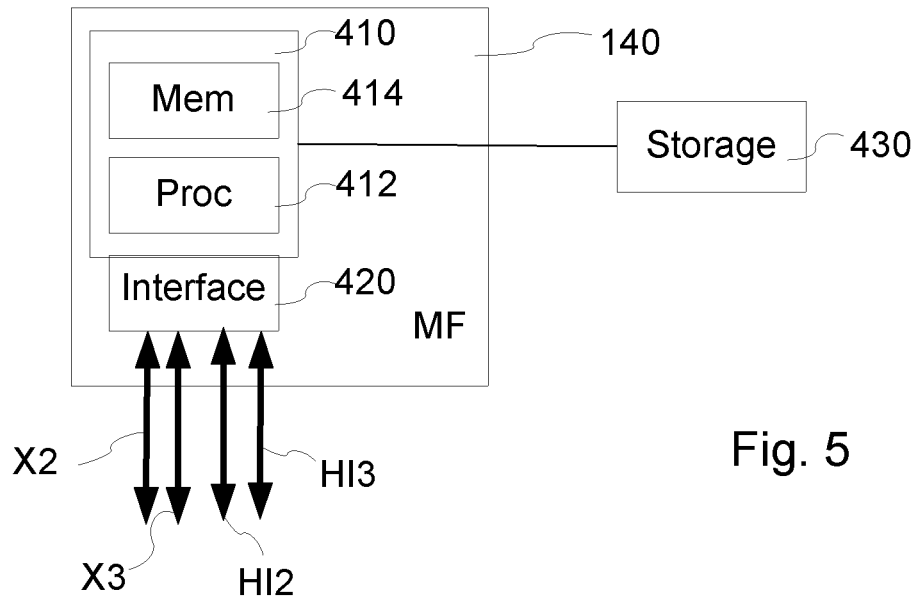
FIG. 5 is a block diagram illustrating a Mediation Function entity.

FIG. 5 is a block diagram illustrating one implementation of the mediation function MF node.

The mediation function node 140 comprises a communication interface 420 and a processing unit 410. The processing unit 410 is connected to the interface 420. By means of the communication interface 420 is the mediation function capable of communicating over different interfaces of the LI system, e.g. X2, X3, HI2 and HI3 (see also FIG. 1). The processing unit 410 further comprises a programmable processor 412 and memory storage 414 for storing instruction code and data for running the processor 412.

The processing unit 410 together with the communication interface 420 is in one implementation configured to deliver received Content of Communication, CC, over HI3 and Intercept Related Information. IRI, over HI2 to a Monitoring Centre, MC, monitoring a target's sessions. Said MC is situated in and supported by a circuit switched, CS, communications system. The processing unit 410 together with the communication interfaces 420, X2, X3 of the MF is further configured to receive IRI and CC of a target's session intercepted during a VoIP session. The processing unit 410 is further configured to generate a correlation number, CN, for the IRI and CC of the intercepted session. If MC is in a CS system, the processing retrieves the calling party number, i.e. the MF number, or the called party number, i.e. the MC number. The processing unit 410 is further configured to insert CN in an extension field of the calling or called party number, The processing unit 410 together with the communication interface 420 is further configured to initiate, after receiving CC, a CC transmission session via a Session Initiating Protocol, SIP, call to the MC by sending a SIP invitation comprising CN in the extension field of the called party number or of the calling party number towards a Border Gateway Control Function, BGCF, node for selecting a Media Gateway. The processing unit 410 and the communication interface 420 are configured to send he CC packets to MC over the CC interface HI3 via the selected Media Gateway converting CC packet format into TDM format and IRI over the IRI interface HI2 to the MC using the same CN.

The CN is either Communication-Identity-Number or a real Correlation Number according to LI standards.

Figure 6:
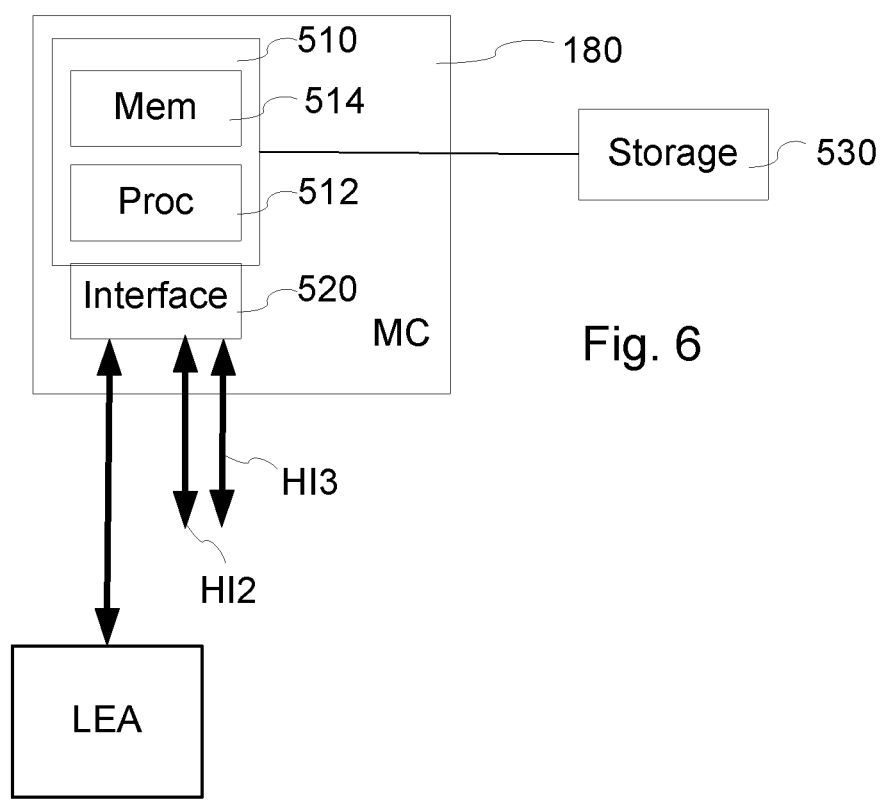
FIG. 6 is a block diagram illustrating a Monitoring Center entity.

FIG. 6 is a block diagram illustrating an implementation of the Monitoring Center, MC, node 180.

The Monitoring Center, MC, node 180 is connectable to a Mediation Function MF 140. The MC node 180 may be a node in the LI system and it comprises a communication interface 520 and a processing unit 510. The processing unit 510 is a processing circuitry connected to the interface 520. The mediation function is by means of the communication interface 520 capable of communicating over different interfaces of the LI system, e.g. HI2 and HI3 (see also FIG. 1). The processing unit 510 further comprises a programmable processor 512 and memory storage 514 for storing instruction code and data for running the processor 512.

The processing unit 510 together with the communication interface 520 of the MC 180 is in one implementation configured to receive Content of Communication, CC, over HI3 and Intercept Related Information, IRI, over HI2 from the Mediation Function, MF, node, The MC is situated in and supported by a circuit switched, CS, communications system. The processing unit 510 together with the communication interface 520 comprising a receiving interface which is configured to receive a correlation number, CN, of a target's session in an extension field of a called party number or of a calling party number in an initiate address message. The message comprises a correlation number, CN, in an extension field of a called party number or of a calling party number. The processing unit 510 is further configured for searching for a CN in the extension field in the calling party number or called party number. If the CN is identified in an extension field, the processing unit 510 is configured to accept a transmission session with the MF, wherein the receiving interface is configured for receiving TDM traffic from the MF over HI3 via a Media Gateway, MGW, node and IRI over HI2 from MF using the same CN.

The entities, blocks and units described above with reference to FIGS. 5, and 6 are logical units, and do not necessarily correspond to separate physical units. Thus, the person skilled in the art would appreciate that the units disclosed in the FIGS. 5 and 6 may be implemented as physically integrated units, and/or physically separate units, and that the units are provided with appropriate processing circuits.

The above described technology implies a number of more or less obvious advantages to different users of lawful interception systems, e.g. manufactures, operators, LEAs, etc.

One of the advantages is that the proposed solution of handling the correlation does not lead to any impact or problem in core network and does not trigger any control mechanisms because the MF acts as a simple PABX.

Then the LEA, knowing the Mediation Function Number, will be able to extract the extension number, containing the correlation number, from the received calling party number and then can correlate the call to the IRI associated to the interception.

No impact is foreseen on the network because BGCF/MGW has neither to implement SIP-I nor to customize their SIP interface. MF number has to be only pre-defined in the network and system as PABX.

Impacts on the MC are minimized because at present, for each call, the MC is already able to receive and store calling party number.

Confidentiality is assured since no information of target is provided out of IRI messages.

There is no high configuration effort in Mediation device and Monitoring Centre.

A number of embodiments of the present invention have been described. It will be understood that various modifications may be made without departing from the scope of the invention. Therefore, other implementations are within the scope of the following claims defining the invention.

ABBREVIATION EXPLANATION

3GPP 3rd Generation Partnership Project
ACM Address complete message
ADMF (Lawful Intercept) Administration Function
ANM Answer message
BICC Bearer Independent Call Control
BGCF Border Gateway Control Function
CC Content of Communication
CS Circuit Switching
DF Delivery Function
HI2 (Lawful Intercept) Handover Interface for IRI reporting
HI3 (Lawful Intercept) Handover Interface for CC reporting
IAM Initial address message
IMS IP Multimedia Subsystem
ISUP ISDN (Integrated Services Digital Network) User Part
IRI Intercept Related Information
LEA Law Enforcement Agency
LEMF Law Enforcement Monitoring Facility
LI Lawful Intercept
NWO Network Operator
MC Monitoring Centres
MCNB Monitoring Centres Number
MGCF Media Gateway Control Function
MF Mediation Function
PABX Private Automatic Branch eXchange
PS Packet Switching
PSTN Public Switched Telephone Network
RTP Real-time Transport Protocol
SIP Session Initiation Protocol
SIP-I SIP with encapsulated ISUP
TDM Time-division multiplexing
VoIP Voice over IP
VoLTE Voice over LTE

REFERENCES

[1] 3GPP TS 33.106 "Lawful Interception requirements (Release 8)";
[2] 3GPP TS 33.107 "Lawful interception architecture and functions (Release 8)";
[3] 3GPP TS 33.108 "Handover interface for Lawful Interception" (Release 8);

The invention claimed is:

1. A method of operating a Mediation Function (MF) node of a Lawful Intercept (LI) system, the MF being configured to deliver received Content of Communication (CC) and Intercept Related Information (IRI) to a Monitoring Center (MC) monitoring a target's sessions, the MC being situated in and supported by a circuit switched (CS) communications system; the method comprising:
receiving IRI and CC of a target's session intercepted during a VoIP session;
generating a correlation number (CN) for the IRI and CC of the intercepted session;
retrieving, if MC is in a CS system, the calling party number of the MF and/or the called party number of the MC;
inserting the CN in an extension field of the calling or called party number;
initiating, after receiving the CC, a CC transmission session via a Session Initiating Protocol (SIP) call to the MC by sending a SIP invitation comprising CN in the extension field of the called party number or of the calling party number towards a Border Gateway Control Function (BGCF) node for selecting a Media Gateway; and
sending, to the MC:
CC packets over Handover Interface HI3 via the selected Media Gateway for the Media Gateway to convert the CC packet format into Time-Division Multiplexing (TDM) format; and
IRI over Handover Interface HI2 using the same CN.

2. The method of claim 1, wherein the CN is a Communication-Identity-Number according to LI standards.

3. The method of claim 1, wherein the CN is a real Correlation Number according to LI standards.

4. The method of claim 1, wherein the calling party number of the MF or the called party number of the MC is predefined as a Private Automatic Branch eXchange (PABX) number.

5. A method of operating a Monitoring Center (MC) of a Lawful Intercept (LI) system, wherein the MC is situated in and supported by a circuit switched (CS) communications system; the method comprising:
receiving Content of Communication (CC) and Intercept Related Information (IRI) from a Mediation Function (MF) node;
receiving a correlation number (CN) of a target's session in an extension field of a called party number or of a calling party number in an initiate address message, wherein the CN is associated with the IRI and the CC;
searching for the CN in the extension field in the calling party number or in the called party number;
accepting a transmission session with the MF if the CN is identified in an extension field; and
receiving, from the target's session:
converted Time Domain Multiplexing (TDM) traffic from the MF over Handover Interface HI3 via a Media Gateway node; and
IRI over Handover Interface HI2 from the MF using the same CN.

6. The method of claim 5, wherein the CN is a Communication-Identity-Number according to LI standards.

7. The method of claim 5, wherein the CN is a real Correlation Number according to LI standards.

8. The method of claim 5, wherein the calling party number or the called party number is predefined as a Private Automatic Branch eXchange (PABX) number.

9. A Mediation Function (MF) node of a Lawful Intercept (LI) system; the MF being configured to deliver received Content of Communication (CC) and Intercept Related Information (IRI) to a Monitoring Center (MC) monitoring a target's sessions; the MC being situated in and supported by a circuit switched (CS) communications system; the MF node comprising:
a communication interface configured to receive IRI and CC of a target's session intercepted during a VoIP session;
processing circuitry operatively connected to the communication interface and configured to:
generate a correlation number (CN) for the IRI and CC of the intercepted session;
retrieve, if MC is in a CS system, the calling party number or the called party number;

inserting the CN in an extension field of the calling or called party number; and initiate, after receiving the CC, a CC transmission session via a Session Initiating Protocol (SIP) call to the MC by sending a SIP invitation comprising CN in the extension field of the called party number or of the calling party number towards a Border Gateway Control Function (BGCF) node for selecting a Media Gateway (MGW);

wherein the communication interface is further configured to send to the MC:

CC packets over Handover Interface HI3 via the selected Media Gateway for the Media Gateway to convert the CC packet format into Time-Division Multiplexing (TDM) format; and IRI over Handover Interface HI2 using the same CN.

10. The MF node of claim 9, wherein the CN is a Communication-Identity-Number according to LI standards.

11. The MF node of claim 9, wherein the CN is a real Correlation Number according to LI standards.

12. The MF node of claim 9, wherein the calling party number or the called party number is predefined as a Private Automatic Branch eXchange (PABX) number.

13. A Monitoring Center (MC) node of a Lawful Intercept (LI) system; wherein the MC is situated in and supported by a circuit switched (CS) communications system; the MC node comprising:

a communication interface configured to:
receive Content of Communication (CC) and Intercept Related Information (IRI) from an Mediation Function (MF) node; and
receive a correlation number (CN) of a target's session in an extension field of a called party number or of a calling party number in an initiate address message, wherein the CN is associated with the IRI and the CC; and processing circuitry operatively connected to the communication interface and configured to:
search for the CN in the extension field in the calling party number or called party number; and
accept, if the CN is identified in an extension field, a transmission session with the MF;

wherein the communication interface is further configured to receive from the MF:
Time-Division Multiplex (TDM) traffic over Handover Interface HI3 via a Media Gateway; and
IRI over Handover Interface HI2 using the same CN.

14. The MC node of claim 13, wherein the CN is a Communication-Identity-Number according to LI standards.

15. The MC node of claim 13, wherein the CN is a real Correlation Number according to LI standards.

16. The MC node of claim 13, wherein the calling party number or the called party number is predefined as a Private Automatic Branch eXchange (PABX) number.

\* \* \* \* \*